(12) United States Patent
Haapoja et al.

(10) Patent No.: US 12,488,384 B2
(45) Date of Patent: Dec. 2, 2025

(54) BUILD AND UPDATE A VIRTUAL STORE BASED ON A PHYSICAL STORE

(71) Applicant: SHOPIFY INC., Ottawa (CA)

(72) Inventors: Juho Mikko Haapoja, Toronto (CA); Byron Leonel Delgado, Ottawa (CA); Stephan Leroux, East Gwillimbury (CA)

(73) Assignee: SHOPIFY INC., Ottowa (CA)

( * ) Notice: Subject to any disclaimer, the term of this patent is extended or adjusted under 35 U.S.C. 154(b) by 384 days.

(21) Appl. No.: 17/332,775

(22) Filed: May 27, 2021

(65) Prior Publication Data

US 2022/0383396 A1    Dec. 1, 2022

(51) Int. Cl.
  *G06Q 30/00*    (2023.01)
  *G06Q 30/0601*  (2023.01)
  *G06T 7/70*     (2017.01)

(52) U.S. Cl.
  CPC ..... *G06Q 30/0643* (2013.01); *G06Q 30/0639* (2013.01); *G06T 7/70* (2017.01); *G06T 2200/08* (2013.01)

(58) Field of Classification Search
  CPC .. G06Q 30/0643; G06Q 30/0639; G06T 7/70; G06T 2200/08
  USPC ................................. 705/26.1–27.2
  See application file for complete search history.

(56) References Cited

U.S. PATENT DOCUMENTS

| | | | |
|---|---|---|---|
| 11,272,256 B2 | 3/2022 | Pate et al. | |
| 2010/0253787 A1* | 10/2010 | Grant | H04N 23/60 348/207.1 |
| 2013/0293530 A1 | 11/2013 | Perez et al. | |
| 2015/0278928 A1 | 10/2015 | Nichols et al. | |
| 2017/0039613 A1 | 2/2017 | Kaehler et al. | |
| 2017/0293971 A1 | 10/2017 | Dollens | |
| 2017/0301000 A1 | 10/2017 | Morgan et al. | |
| 2018/0075523 A1 | 3/2018 | Odizzio et al. | |
| 2018/0114264 A1* | 4/2018 | Rafii | G06T 15/50 |
| 2019/0206130 A1 | 7/2019 | Ericson et al. | |

(Continued)

FOREIGN PATENT DOCUMENTS

| | | |
|---|---|---|
| KR | 102057227 B1 | 12/2019 |
| WO | WO-2018/203512 A1 | 11/2018 |

OTHER PUBLICATIONS

Advisory Action on U.S. Appl. No. 17/110,665 dated Sep. 28, 2022 (3 pages).

(Continued)

*Primary Examiner* — Anand Loharikar
(74) *Attorney, Agent, or Firm* — Foley & Lardner LLP

(57) ABSTRACT

Disclosed herein are methods and systems for building and updating a virtual store based on a physical store. A computing system is structured to receive captured images of a physical space having a set of products. The physical space is simulated by a three-dimensional (3D) model of the physical space. A corresponding representation of the set of products is positioned relative to the 3D model. The computing system is structured to detect, based on the captured images, product information for products in the physical space and generate, based on the product information, an updated representation of the set of products based on the product information. The updated representation of the set of products corresponds to the products in the physical space as shown in the captured images.

20 Claims, 7 Drawing Sheets

(56) References Cited

U.S. PATENT DOCUMENTS

| | | | |
|---|---|---|---|
| 2019/0244436 | A1 | 8/2019 | Stansell et al. |
| 2019/0369742 | A1 | 12/2019 | Ghazanfari |
| 2020/0273092 | A1 | 8/2020 | Wilson et al. |
| 2021/0004421 | A1 | 1/2021 | Zadorojniy et al. |
| 2021/0117071 | A1* | 4/2021 | Gharpuray .......... G06F 3/04815 |
| 2022/0092681 | A1 | 3/2022 | Haapoja et al. |
| 2022/0114639 | A1 | 4/2022 | Christensen et al. |
| 2022/0383396 | A1 | 12/2022 | Haapoja et al. |
| 2022/0383397 | A1 | 12/2022 | Haapoja et al. |

OTHER PUBLICATIONS

Advisory Action on U.S. Appl. No. 17/110,665 dated Jun. 20, 2023 (3 pages).

Ben Schafer, J., Konstan, J.A. & Riedl, J. 2001, "E-commerce Recommendation Applications", Data Mining and Knowledge Discovery, vol. 5, No. 1-2, pp. 115-153. (Year: 2001).

European Patent Office Examination Report on EP Application No. 21151031 dated May 6, 2023 (7 pages).

Extended European Search Report on EP Application No. 21151031 dated Jun. 25, 2021 (8 pages).

Final Office Action on U.S. Appl. No. 17/110,665 dated Apr. 7, 2023 (33 pages).

Final Office Action on U.S. Appl. No. 17/110,665 dated Jul. 7, 2022 (32 pages).

Intellectual Property Office of India Examination Report on Application No. 202124007193 dated Jan. 14, 2022 (8 pages).

Non-Final Office Action on U.S. Appl. No. 17/110,665 dated Dec. 22, 2021 (33 pages).

Non-Final Office Action on U.S. Appl. No. 17/110,665 dated Nov. 8, 2022 (32 pages).

Moes, Anne, The online appeal of the physical shop: How a physical store can benefit from a virtual representation, Jun. 2017, Heliyon, vol. 3, issue 6 (Year: 2017).

International Search Report and Written Opinion issued in International Application No. 3,147,930 dated Sep. 16, 2024 (4 Pages).

Syberfeldt et al., "Augmented Reality Smart Glasses in the Smart Factory: Product Evaluation Guidelines and Review of Available Products," in IEEE Access, vol. 5, pp. 9118-9130, 2017 (Year: 2017).

CA Office Action for Application No. 3,147,930 mailing date Aug. 28, 2025, 4 pages.

* cited by examiner

FIG. 2

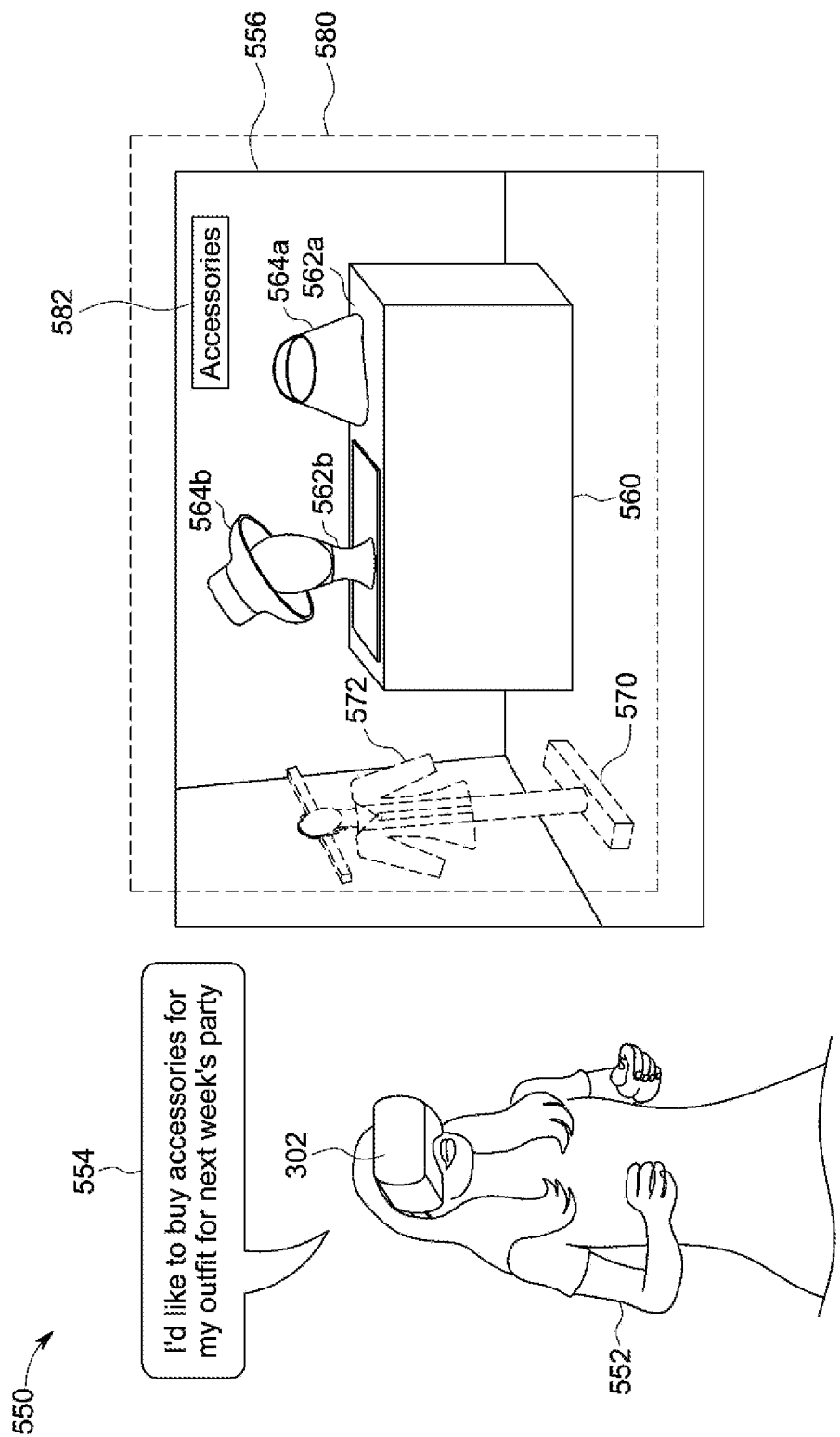

BUILD AND UPDATE A VIRTUAL STORE BASED ON A PHYSICAL STORE

TECHNICAL FIELD

This application relates generally to systems, methods, and computer-readable media for generating and managing a virtual store based on a physical store. More specifically, this application relates to building and updating a virtual store based on a physical store and to customize a user experience in the virtual store.

BACKGROUND

Individuals may use immersive reality devices, such as augmented reality (AR) devices and virtual reality (VR) devices, for various applications enabled by the proliferation of the Internet. These applications include, for example, browsing websites, gaming, online shopping, etc. To make an online shopping user experience realistic, an immersive reality store may be provided by a merchant. In order to provide a high-fidelity representation of a physical store, it may be necessary to perform multiple high-resolution scans of an immersive reality environment. For example, an initial scan may be needed to generate an initial rendering of a physical store, and subsequent scans may be needed to update the initial rendering of the physical store. Generating high-resolution scans generally requires a significant expenditure of memory and computer processing resources. Transmitting high-resolution scans over a network generally requires significant consumption of network resources, such as bandwidth, which increases latency for applications that share the transmission channel with an immersive reality shopping application. Some conventional solutions attempt to create graphical representations of physical stores, but such graphical representations often lack the dimensional accuracy, visual look and feel, and updated product inventory of the physical store.

Shoppers in immersive reality stores browse multiple products and select the products of interest for purchase. However, product representations in immersive reality stores may be static. More specifically, disadvantages to conventional immersive reality stores include displaying all products offered to a particular shopper rather than just products of interest, products of interest in a physical store typically cannot be experienced in their intended environments, and it may be difficult for shoppers to test the features of particular products in intended environments.

BRIEF DESCRIPTION OF THE DRAWINGS

The accompanying drawings constitute a part of this specification and illustrate embodiments of the subject matter disclosed herein.

FIG. 2 shows a home page of an administrator, according to an embodiment.

FIG. 5B shows an electronic user interface structured to allow a customer-user to interact with products in a customized virtual store, according to an embodiment.

DETAILED DESCRIPTION

Figure 1:
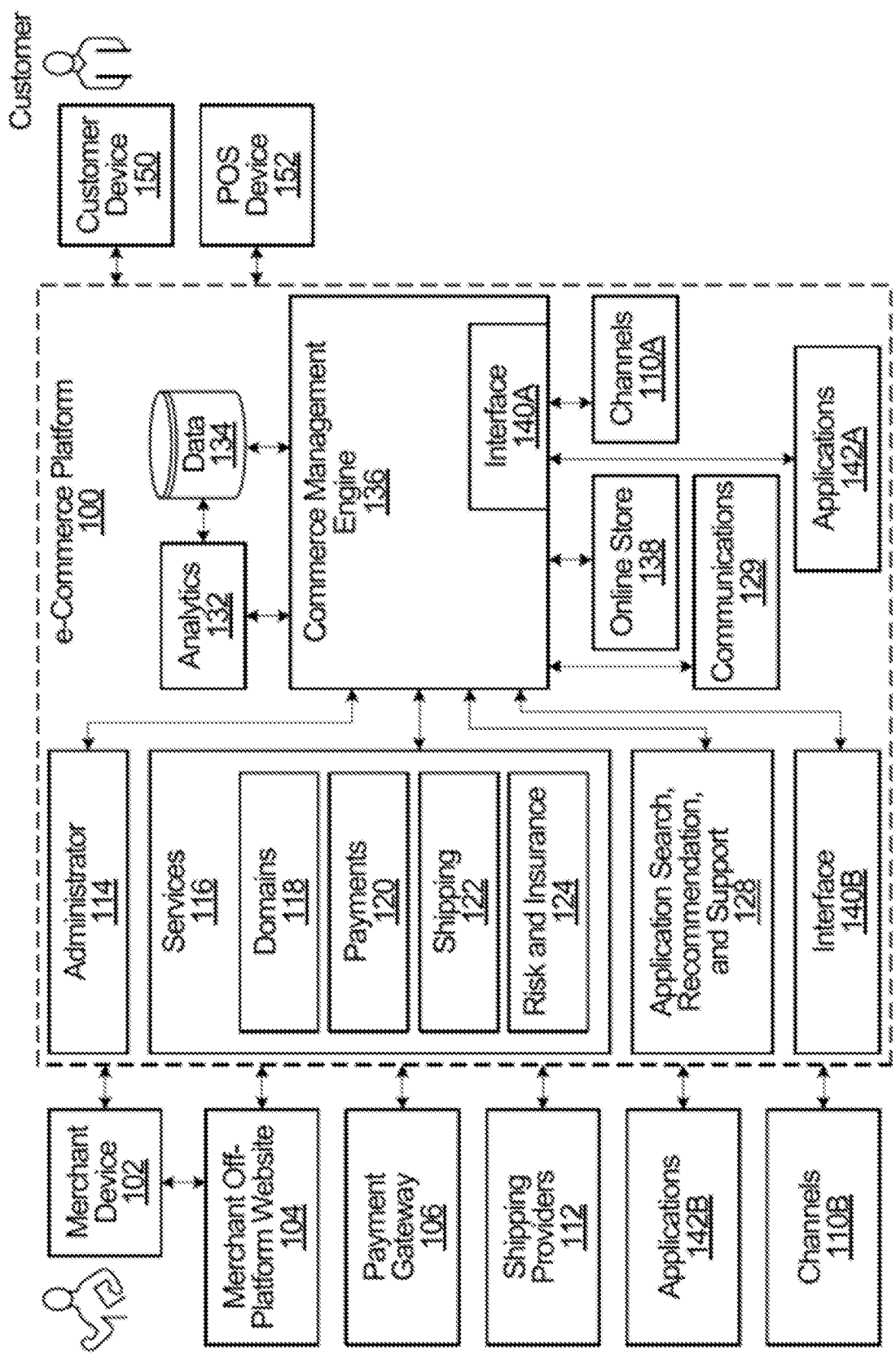
FIG. 1 shows an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The systems and methods described herein allow for generating and updating product items in a virtual store as well as simulating a structure of a physical store based on one more videos of a physical store. More specifically, the systems and methods described herein may digitize a physical store and maintain a virtual store based on various attributes of the physical store. When various attributes (e.g., store layout, product inventory, product locations, product quantities, new promotional items) of the physical store change, the corresponding attributes of the virtual store are updated accordingly. Advantageously, an incremental physical environment scanning approach may be used such that a physical store can be initially scanned using a high-resolution camera and subsequent updates can be captured using a less resource-intensive approach. The less resource-intensive approach can include, for example, capturing a coarse image of the physical store using an in-store monitoring system (e.g., a security camera, a camera activated by a motion detection device, a merchant user's personal smart device, etc.) and extracting from the coarse image the attributes sufficient to identify particular inventory items. The corresponding inventory items in the virtual environment may be updated and a higher resolution version rendered using retrievably stored information from an inventory computing system.

Further, the systems and methods of the present disclosure solve the technical problem of minimizing bandwidth use and consumption of processor resources on end-user devices in immersive reality applications. To that end, the systems and methods of the present disclosure reduce a set of products presented to a customer in a virtual (e.g., immersive reality) store to a set of products determined to be relevant to the customer.

I. Example E-Commerce Platform

In some embodiments, the methods disclosed herein may be performed on or in association with a commerce platform, such as an e-commerce platform. Therefore, an example of a commerce platform will be described.

FIG. 1 illustrates an e-commerce platform 100, according to an illustrative system embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), and the like. However, even these 'other' merchant commerce facilities may be incorporated into the e-commerce platform 100, such as where POS devices 152 in a physical store of a merchant are linked into the e-commerce platform 100, where a merchant off-platform website 104 is tied into the e-commerce platform 100, such as through 'buy buttons' that link content from the merchant off-platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms of online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant device 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) of the customer device 150 then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
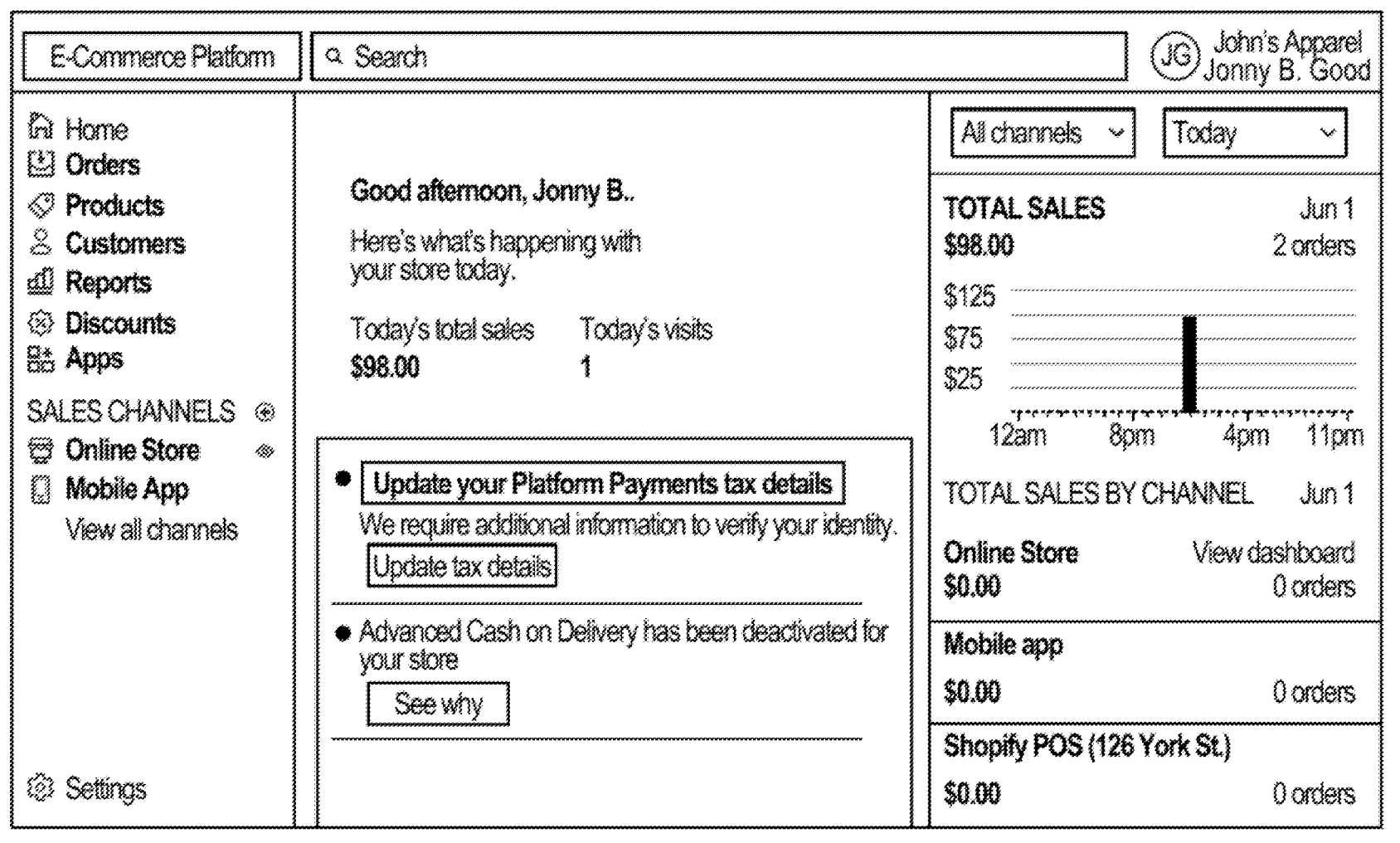

FIG. 2 depicts a non-limiting embodiment for a home page of a merchant administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store 138, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the merchant device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, backpressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension or API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 136 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

II. Example Networked Components of System

Figure 3:
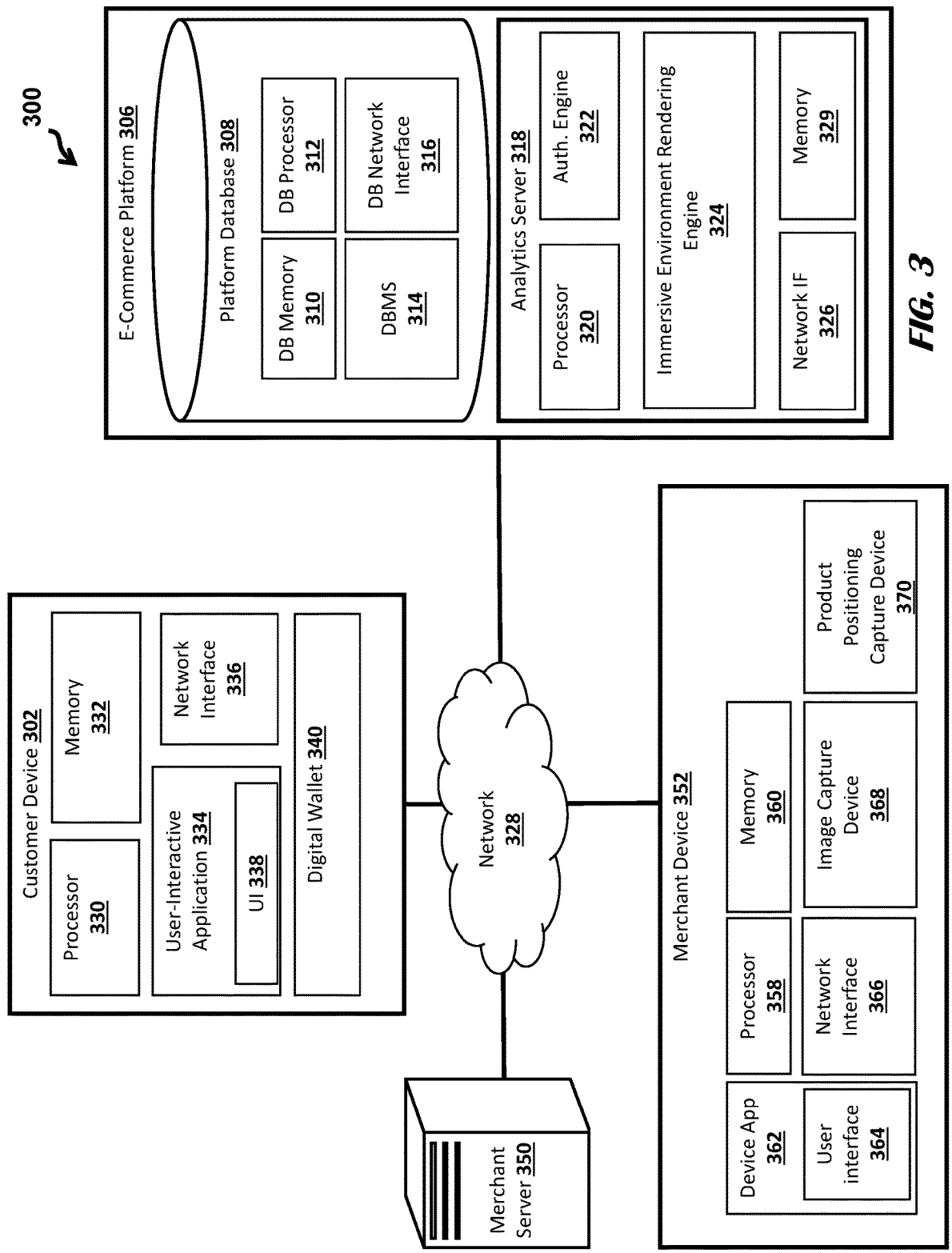
FIG. 3 shows components of a system for generating and managing a virtual store based on a physical store.

FIG. 3 illustrates components of a system 300 for generating and managing a virtual store, according to an embodiment. The system 300 includes a customer device 302, a merchant device 352, and a merchant server 350 to connect with an e-commerce platform 306 via a network 328. The depicted system 300 is described and shown in FIG. 3 as having one of each component for ease of description and understanding of an example. It should, however, be appreciated that embodiments may include any number of the components described herein. It should be further appreciated that embodiments may comprise additional or alternative components, or may omit certain components, and still fall within the scope of this disclosure.

The network 328 may include any number of networks, which may be public and/or private networks. The network 328 may comprise hardware and software components implementing various network and/or telecommunications protocols facilitating communications between various devices, which may include devices of the system 300 or any number of additional or alternative devices not shown in FIG. 3. It should be appreciated that the network 328 may be implemented as a cellular network, a Wi-Fi network, or other wired local area network (LAN) or wireless LAN, a WiMAX network, or other wireless or wired wide area network (WAN), and the like. The network 328 may also communicate with external servers of other external services coupled to the network 328 such as servers hosting a social media platform, a banking platform, or the merchant server 350.

The network 328 may include any number of security devices or logical arrangements (e.g., firewalls, proxy servers, DMZs) to monitor or otherwise manage web traffic to the e-commerce platform 306. Security devices may be configured to analyze, accept, or reject incoming web requests from the customer device 302, the merchant server 350, and/or the merchant device 352. In some embodiments, a security device may be a physical device (e.g., a firewall). Additionally or alternatively, a security device may be a software application (e.g., Web Application Firewall (WAF)) that is hosted on, or otherwise integrated into, another computing device of the system 300. The security devices monitoring web traffic are associated with, and administered by, the e-commerce platform 306.

The customer device 302 may be any electronic device comprising hardware and software components capable of performing the various tasks and processes described herein. Non-limiting examples of the customer device 302 may include mobile phones, tablets, laptops, personal computers, and/or immersive reality devices, among others. In some embodiments, the customer device 302 may be an immersive reality device (a headset, smart glasses, etc.) structured to allow the user to access immersive reality applications. In some embodiments, the customer device 302 may be a computing device comprising a display and/or a physical or virtual touchscreen that allows users to interact with various applications. In some embodiments, the features of a productivity device (e.g., tablet, smart phone, smart etc.) are included in a particular customer device 302 along with immersive reality features. As a non-limiting example, the features of a productivity device may include a digital wallet 340. The digital wallet 340 may be a software program provided to the customer device 302 that allows the customer to make electronic transactions in the virtual store using digital currency and/or using payment information associated with the customer.

The customer device 302 may include a processor 330, memory 332, user interface 338, and network interface 336. An example of a user interface 338 is a display screen (which may be a touch screen), a virtual user-interactive display or hologram, a gesture recognition system, an eye tracking device, a keyboard, a stylus, a joystick, and/or a mouse. The network interface 336 is provided for communicating over the network 328. The structure of the network interface 336 will depend on how the customer device 302 interfaces with the network 328. For example, if the customer device 302 is a mobile phone, tablet, and/or a wireless immersive reality device, the network interface 336 may include a transmitter/receiver with an antenna to send and receive wireless transmissions to/from the network 328. The network interface 336 may include, for example, a network interface card (NIC), a computer port, and/or a network socket. The processor 330 directly performs or instructs all of the operations performed by the customer device 302. Non-limiting examples of these operations include processing user inputs received from the user interface 338, preparing information for transmission over the network 328, processing data received over the network 328, and instructing a display screen to display information. The processor 330 may be implemented by one or more processors that execute instructions stored in the memory 332. Alternatively, some or all of the processor 330 may be implemented using dedicated circuitry, such as an ASIC, a GPU, or a programmed FPGA.

When communicating with components of the e-commerce platform 306, the customer device 302 may generate web traffic (or web session data) that is processed by or otherwise accessible to the analytics server 318 of the e-commerce platform 306. The web traffic may comprise data packets that include various types of data that can be parsed, analyzed, or otherwise reviewed by various programmatic algorithms of the analytics server 318. For instance, the web traffic data may indicate which website was accessed by a user operating the customer device 302 (e.g., whether a customer operating the customer device 302 has accessed a product page in a virtual store, a checkout page in the virtual store, etc.).

In one example, a customer operating the customer device 302 visits a web site of a merchant (e.g., an online store of the merchant) hosted by the merchant server 350 and/or the e-commerce platform 306 using the application 334. The virtual store may include one or more features hosted (or otherwise produced or functionally controlled) by the analytics server 318. For instance, the analytics server 318 of the e-commerce platform 306 may provide (e.g., host) at least a portion of a webpage for providing features of the virtual store to the customer device 302, an inventory database, navigation control definitions, virtual store layout definitions, and so forth. In some embodiments, some or all of these components may be loaded or retrieved on an as-needed basis from the merchant server 350. For example, the merchant server 350 may maintain an inventory database, which may be replicated to and/or queried by the analytics server 318 when current inventory information is needed (e.g., as described further herein in relation to building a virtual store, updating a virtual store, and customizing a virtual store for a particular user.)

A user-interactive application 334 may be provided to the customer device 302. As used herein, the term "provided to," when used with respect to an application, refers to the application being made available to the user at a particular computing device. In some embodiments, the application is installed on the computing device. In some embodiments, the application is executing on the computing device (e.g., via a browser) without being installed on the computing device. In some embodiments, the application is accessible at computing device via an emulator or a similar application delivery framework (e.g., Citrix, Azure, etc.), and is installed on and/or executing on a remote computing system relative to the computing device. The user-interactive application 334 may transmit and receive data packets in order to display or otherwise provide to the user various features of the virtual store on the user interface 338. The user-interactive application 334 (or other application) may connect the customer device 302 to the analytics server 318 and/or the merchant server 350 using an IP address obtained by translating a domain name. The analytics server 318 and/or the merchant server 350 may execute code associated with the virtual store definitions and layout controls and render the appropriate objects to be presented to the user via the user interface 338. The user may interact with items in the virtual store to select various items for purchase.

The merchant device 352 may be any electronic device comprising hardware and software components capable of performing the various tasks and processes described herein. Non-limiting examples of the customer device 302 may include mobile phones, tablets, laptops, personal computers, and/or immersive reality devices, among others. According to various embodiments, a merchant user can use the merchant device 352 to build a virtual store, update a virtual store, and/or manage inventory in a virtual store.

The merchant device 352 may include a processor 358, memory 360, user interface 364, and network interface 366. An example of the user interface 364 is a display screen (which may be a touch screen), a virtual user-interactive display or hologram, a gesture recognition system, an eye tracking device, a keyboard, a stylus, a joystick, and/or a mouse. The network interface 366 is provided for communicating over the network 328. The structure of the network interface 366 will depend on how the merchant device 352 interfaces with the network 328. For example, if the merchant device 352 is a mobile phone, tablet, and/or a wireless immersive reality device, the network interface 366 may include a transmitter/receiver with an antenna to send and receive wireless transmissions to/from the network 328. The network interface 366 may include, for example, a network interface card (NIC), a computer port, and/or a network socket. The processor 358 directly performs or instructs all of the operations performed by the merchant device 352. Non-limiting examples of these operations include processing user inputs received from the user interface 364, preparing information for transmission over the network 328, processing data received over the network 328, and instructing a display screen to display information. The processor 358 may be implemented by one or more processors that execute instructions stored in the memory 360. Alternatively, some or all of the processor 358 may be implemented using dedicated circuitry, such as an ASIC, a GPU, or a programmed FPGA.

When communicating with components of the e-commerce platform 306, the merchant device 352 may generate web traffic (or web session data) that is processed by or otherwise accessible to the analytics server 318 of the e-commerce platform 306. The merchant device 352 may also electronically communicate, via the network 328, with the merchant server 350. The web traffic may comprise data packets that include various types of data that can be parsed, analyzed, or otherwise reviewed by various programmatic algorithms of the analytics server 318.

The merchant device 352 is shown to include an image capture device 368. According to various embodiments, the image capture device may be a photo camera and/or a video camera. In some embodiments, rather than being included (e.g., fixedly coupled to the merchant device 352), the image capture device 368 is separate from the merchant device 352. For example, in one embodiment, the merchant device 352 is a phone or a tablet, and the image capture device 368 is a built-in camera. In other embodiments, the image capture device 368 is a separate camera, such as an in-store security camera. In operation, a merchant user operating the merchant device 352 can use the image capture device 368 to generate captured images (e.g., a video, a 3D photo, etc.) of a physical store. The captured images can be transmitted, via the network 328, to the analytics server 318, where the immersive environment rendering engine 324 can generate a virtual store as described further herein.

The physical store can further include a product positioning capture device 370, which may be included in the merchant device 352 (e.g., if the merchant device 352 is also a point-of-sale device capable of scanning/identifying products and/or performing check-out operations) or may be separate from the merchant device 352. According to various embodiments, the product positioning capture device 370 can include a sensor component (e.g., embodied as a near-field communications (NFC) reader, a radio-frequency identification (RFID) reader, etc.) capable of receiving or detecting information regarding unique product identifiers for products in a particular physical store. In some embodiments, the product positioning capture device 370 can include a digital ruler structured to measure distance between objects (e.g., individual products, groups of products, display surfaces, etc.). Product positioning information can be transmitted, via the network 328, to the analytics server 318, where the immersive environment rendering engine 324 can use it to determine product positioning in a physical store and recreate the same in a virtual store, as described further herein.

As shown, the e-commerce platform 306 is a computing system infrastructure that may be owned and/or managed (e.g., hosted) by an e-commerce service and, in some embodiments, may be the same as or similar to that described with reference to FIGS. 1-2, though this need not be the case. The e-commerce platform 306 includes electronic hardware and software components capable of performing various processes, tasks, and functions of the e-commerce platform 306. For instance, the computing infrastructure of the e-commerce platform 306 may comprise one or more platform networks (not shown) interconnecting the components of the e-commerce platform 306. The platform networks may comprise one or more public and/or private networks and include any number of hardware and/or software components capable of hosting and managing the networked communication among devices of the e-commerce platform 306.

The components of the e-commerce platform 306 include the analytics server 318 and a platform database 308. However, it should be appreciated that embodiments may include additional or alternative components capable of performing the operations described herein. In some implementations, certain components of the e-commerce platform 306 may be embodied in separate computing devices that are interconnected via one or more public and/or private internal networks (e.g., network 328). In some implementations, certain components of the e-commerce platform 306 may be integrated into a single device. For instance, the analytics server 318 may host the platform database 308.

Furthermore, the e-commerce platform 306 may include the analytics server 318 configured to serve various functions of the e-commerce platform 306. Non-limiting examples of such functions may include webservers hosting webpages (or at least a portion of a webpage or a virtual store definition) on behalf of merchants, security servers executing various types of software for monitoring web traffic (e.g., determining that a customer has approached a particular virtual store in an immersive environment using the customer device 302, is interacting with an item in a virtual store using the customer device 302, etc.) and database servers hosting various platform databases 308 of the e-commerce platform 306, among others. The analytics server 318 may also perform various methods to authenticate the customer using the customer device 302, authenticate a merchant user using a merchant device 352, authenticate an image capture device 368, and/or authenticate a product positioning capture device 370.

The illustrative e-commerce platform 306 is shown and described as having only one analytics server 318 performing each of the various functions of the e-commerce service. It should, however, be appreciated that FIG. 3 is merely illustrative and that embodiments are not limited to the description of system 300 or the particular configuration shown in FIG. 3. The software and hardware of the analytics server 318 may be integrated into a single distinct physical device (e.g., a single analytics server 318) or may be distributed across multiple devices (e.g., multiple analytics servers 318). For example, some operations may be executed on a first computing device while other operations may be executed on a second computing device, such that the functions of the analytics server 318 are distributed among the various computing devices. In some implementations, the analytics server 318 may be a virtual machine (VM) that is virtualized and hosted on computing hardware configured to host any number of VMs.

The platform database 308 stores and manages data records concerning various aspects of the e-commerce platform 306, including information about, for example, actors (e.g., merchants, consumers, or platform administrators), electronic devices, merchant offerings (e.g., products, inventory, or services), authentication protocols, authentication credentials (e.g., user's passwords or other data needed for authenticating the customers) various metrics and statistics, machine-learning models, merchant pages hosting merchant stores, and other types of information related to the e-commerce platform 306 (e.g., usage and/or services).

The platform database 308 may also include various libraries and data tables including detailed data needed to perform the methods described herein, such as generating, updating and/or managing a virtual store. For instance, the analytics server 318 may generate a data table associated with various inventory items (products, product sets) and their identifiers. The analytics server 318 may use this data table to determine which products should be included in a visual modifier generated for a particular customer and provided via the user-interactive application 334 executing on the customer device 302. In another example, the analytics server 318 may generate and retrievably store a 3D model for a virtual store.

As used herein in a non-limiting example, a 3D model for a virtual store can refer to one or more coordinate-based representations of a corresponding physical space (e.g., physical store) where various points within a coordinate space that defines the 3D model are anchored to (e.g., stored relationally to, associated with, or include) one or more definitions of items in a virtual store, such as display surfaces, products, product sets, item positioning information, user-interactive controls, etc. In some embodiments, a 3D model can include a plurality of other 3D models (e.g., a virtual store can include surfaces, which can display products), and the nested 3D models can be anchored to specific points within the larger 3D model. The merchant user may use the device application 362 provided to the merchant device 352 to edit, remove, and move these items when the 3D model is generated or updated, which may update the coordinates, dimensions, or other parameters (e.g., color, opacity, visibility) for the corresponding item(s). The terms 3D model and virtual store may be used interchangeably or, when so indicated by context, the term virtual store may refer to a 3D model that has been rendered on a user device.

The platform database 308 may be hosted on any number of computing devices having a processor (sometimes referred to as a database (DB) processor 320) and non-transitory machine-readable memory configured to operate as a DB memory 310 and capable of performing the various processes and tasks described herein. For example, one or more analytics servers 318 may host some or all aspects of the platform database 308.

A computing device hosting the platform database 308 may include and execute database management system (DBMS) 314 software, though a DBMS 314 is not required in every potential embodiment. It should be appreciated that the platform database 308 can be a single, integrated database structure or may be distributed into any number of database structures that are configured for some particular types of data needed by the e-commerce platform 306. For example, a first database could store user credentials and be accessed for authentication purposes, and a second database could store raw or compiled machine-readable software code (e.g., HTML, JavaScript) for webpages and virtual store definitions.

The computing device hosting the platform database 308 may further include a DB network interface 326 for communicating via platform networks of the e-commerce platform 306. The structure of the DB network interface 316 will depend on how the hardware of the platform database 308 interfaces with other components of the e-commerce platform 306. For example, the platform database 308 may be connected to the platform network with a network cable, the DB network interface 326 may include, for example, a NIC, a computer port, and/or a network socket. The processor 320 directly performs or instructs all of the operations performed by the platform database 308.

Non-limiting examples of such operations may include processing queries or updates received from the analytics server 318, customer device 302, merchant device 352, and/or merchant server 350; preparing information for transmission via the platform network and/or the external networks 328; and processing data received via the platform network and/or the external networks 328. The processor 320 may be implemented by one or more processors that execute instructions stored in the DB memory 310 or other non-transitory storage medium. Alternatively, some or all of the DB processor 312 may be implemented using dedicated circuitry such as an ASIC, a GPU, or a programmed FPGA.

The DB memory 310 of the platform database 308 may contain data records related to, for example, virtual store definitions, and various information and metrics derived from web traffic involving customer activity in a particular virtual store. The data may be accessible to the analytics server 318.

The analytics server 318 may be any computing device that comprises a processor 320 and non-transitory machine-readable storage media (e.g., server memory 329) and that is capable of executing the software for one or more functions such as authentication engine 322 and/or immersive environment rendering engine 324. In some cases, the server memory 329 may store or otherwise contain the computer-executable software instructions, such as instructions needed to execute the authentication engine 322 and/or immersive environment rendering engine 324. The software and hardware components of the analytics server 318 enable the analytics server 318 to perform various operations that serve particular functions of the e-commerce platform 306.

The analytics server 318 may execute the authentication engine 322 to authenticate various computing devices, such as those shown in FIG. 3. The location of the authentication engine 322 is merely an example. The authentication engine 322 may be executed by the analytics server 318 and/or the respective computing devices under the direction of the analytics server 318. Therefore, the authentication engine 322 can be performed locally on a respective computing device or in the back-end by the analytics server 318. Additionally or alternatively, the authentication engine 322 could be provided by the e-commerce platform 306 as a separate web-based or cloud-based service.

The analytics server 318 may also include the immersive environment rendering engine 324. The immersive environment rendering engine 324 may include software components (e.g., executable files) and/or hardware components (e.g., processor 320, server memory 329) and is structured to exchange data and computer-executable commands with other systems, such as the customer device 302, the merchant server 350, the merchant device 352, the image capture device 368, and/or the product positioning capture device 370.

In an embodiment, the immersive environment rendering engine 324 is structured to generate and/or update a 3D model for a virtual store (e.g., a 3D model stored in the platform database 308) based on a physical store.

For example, as an initial step, the immersive environment rendering engine 324 can receive, from the merchant device 352 and/or from the image capture device 368, captured images of a particular physical space corresponding to a physical store. The immersive environment rendering engine 324 can extract a segment (e.g., one or more product images) from the received captured images. In some embodiments, the captured images may be included in video content recorded by the image capture device 368 (for example, a merchant user can use the image capture device 368 to record a video that captures the layout and products in a physical store). The video content may be structured according to any suitable format, such as .mp4, .mov, .wmv, .avi, etc. The video content may include a single file or multiple files. In some embodiments, the immersive environment rendering engine 324 may include data storage media, such as the platform database 308. The data storage media may have retrievably stored thereon various parameters for evaluating the quality of the received video content to ensure that the video content meets minimum quality requirements. According to various arrangements, the minimum quality requirements may include resolution, size, length, degrees of coverage, etc. The immersive environment rendering engine 324 may perform pre-processing operations that may include confirming that the received video content meets the minimum quality requirements.

The immersive environment rendering engine 324 may extract certain content from the video content. The extracted content and/or information may correspond to various components of a physical store, such as surfaces (shelves, display tables, mannequins, etc.), products, and/or groups of products. For example, a surface (e.g., shelf) may have disposed thereon a quantity of a particular product (e.g., jeans, water bottles) positioned in the physical store in proximity to one another to form a group (e.g., five folded and stacked pairs of jeans, six pack of water bottles). The group may include individual items, which may have the same or different characteristics (e.g., the jeans may have the same size or different sizes, different flavors of beverages, different sizes of beverages).

In some embodiments, the extracted content and/or information may include one or more images that correspond to frames from the video content. The images may be further segmented into subsets to identify each particular surface based on, for example, a set of pixels of a particular color group, a set of pixels of a particular size, and/or a set of pixels forming a particular shape. In an example, detecting a certain degree of contrast between the set of pixels and its corresponding background can allow the immersive environment rendering engine 324 to determine that the subset corresponds to a particular group of items (e.g., a product stack). Further image subsets may be extracted from an image subset that corresponds to the product stack. For example, based on determining the shape(s) of items within the stack, the immersive environment rendering engine may determine the quantity and type of products included in the stack.

Further, the immersive environment rendering engine 324 may use the video content and/or additional information to determine the dimensions of the store. In some embodiments, in addition to the video content, the immersive environment rendering engine may receive other information, such as the dimensions for the 3D physical space provided by the merchant device 352 (e.g., by being manually entered by a merchant user) and/or by the product positioning capture device 370. The immersive environment rendering engine 324 may use this information in combination with relative locations of items in the image to determine the relative (in relation to the physical space that defines the store) dimensions of various items, such as shelves, products, etc.

The immersive environment rendering engine 324 can generate a 3D model of a virtual store that corresponds to the physical store based on the extracted images and/or information. For example, the immersive environment rendering engine 324 can generate and retrievably store a hierarchical set of nested component definitions that, together, comprise the 3D model of a virtual store. The component definitions can include physical space definitions that have various quantitative and/or descriptive properties (e.g., shape, length, width, height, volume, background color). The component definitions can include one or more coordinates that define, at least in part, the physical space. In some embodiments, the coordinates are determined relative to a particular point of origin within the 3D model. For example, the 3D model may have a point of origin defined as (1, 1, 1), corresponding, respectively, to a (length, width, height) position of a voxel in the 3D model. The component definitions can further include surface definitions for various display surfaces within the 3D model that correspond to display surfaces in a physical store.

In some embodiments, component definitions in a 3D model may further include a set of digital product placeholders (anchors) that can each have a corresponding set of coordinates and that can be programmatically bound to a particular display item (e.g., mannequin), product or group of products as described further herein. In some embodiments, the immersive environment rendering engine 324 can supplement information received in the captured images to add reusable template components, such as virtual check-out counters, predefined user interaction hotspots (e.g., hotspots that allow a user to rotate a virtual mannequin or product display tree), etc. The reusable components may have been previously stored in the platform database 308 and may be modified to apply certain parameters for a consistent look and feel of the virtual store (e.g., size, shape, color, merchant logo, brand logo, etc.).

The immersive environment rendering engine 324 can populate the 3D model with products based on physical products identified from the received captured images of the physical store. For example, in some embodiments, the pictorial content may include a sufficient amount of pictorial data to identify a product (e.g., a product label and/or identifier may be visible in the captured images and may be extracted using a suitable photogrammetry technique, optical character recognition, and the like). In some embodiments, supplemental information, such as that provided by the product positioning capture device 370, can be used. More specifically, the information may be provided by one or more product positioning capture devices 370, which may be mobile or fixedly disposed within the physical store. For example, each product captured in the received images may have physically attached thereto an RFID label, an NFC chip, or a similar physical device capable of uniquely identifying the product (e.g., via an encoded device identifier) and of broadcasting or transmitting its identifying information to the product positioning capture devices 370. In some embodiments, the product positioning capture devices 370 may have known physical locations within the physical store. In some embodiments, the analytics server 318 may include a machine learning circuit structured to aid in identifying products and/or determining relative product locations without the use of depth sensor technology, such as LiDAR. For example, the machine learning circuit may be structured to use known location coordinates of various reference points within a physical store in combination with scaling information. The machine learning circuit may be trained to identify at least one of such points in a received image, determine the location of the reference point within the image (e.g., as a particular pixel or set of pixels) and use this information in combination with scaling information and location information for a particular product within the image to determine the distance between the product and the reference point.

The immersive environment rendering engine 324 may use the product positioning capture device 370 location information in combination with the product item information to identify products that cannot be identified based on the received images alone. For example, the product positioning capture devices 370 may transmit to the immersive environment rendering engine 324 a value for the signal strength associated with each reading, and the immersive environment rendering engine 324 may use the signal strength information to determine the physical distance of a particular item from the reader(s). For example, various ranges of signal strength values can be correlated to a measure of physical distance and retrievably stored in the platform database 308. The physical distance may correspond to a particular radius from a product positioning capture device 370. The immersive environment rendering engine 324 may further use the extracted video content to identify matching items within the radius. Accordingly, as a physical product is moved, shifted, replaced, unfolded, or otherwise adjusted in position in the physical space, the immersive environment rendering engine can determine and update the location and position the corresponding virtual object in the virtual environment.

Further, the immersive environment rendering engine 324 may retrieve more detailed product information from an inventory store of the platform database 308 in order to generate the corresponding virtual items. The more detailed product information may be used to position the product item within the 3D model. The more detailed product information may include a high-resolution 3D representation of a particular product, a 360-degree view rendering of the product, product specifications, product quantity information, etc.

In some embodiments, the immersive environment rendering engine 324 may generate a product index for at least one product determined based on the received images and/or supplemental information from additional devices or inventory database, as described above. The product index may include a product identifier that corresponds to the more detailed product information from the platform database 308. The product index may further include coordinate information, which may be determined by the immersive environment rendering engine 324 using, for example, information provided by product positioning capture device(s)

370 as described above. In some embodiments, when generating a particular product placement within a 3D model, the immersive environment rendering engine 324 may associate the product index to a particular anchoring point on a digitally generated surface within the 3D model.

The product index may be retrievably stored relationally to the 3D model information (e.g., relationally to a particular anchoring point) in the platform database 308. When the immersive environment rendering engine 324 renders the 3D model to a particular user via the application 334 of the customer device 302, the immersive environment rendering engine 324 may populate the 3D model with retrievably stored product information (e.g., a high-resolution 3D representation of a particular product, a 360-degree view rendering of the product, product specifications, product quantity information, etc.). The corresponding product may be positioned in the anchoring point stored relationally to the product index.

A collection of products included in a 3D model and/or rendered to a user based on user characteristics, as described further herein, can be the entire collection of products available for sale in the physical store, or may be a smaller subset of products (e.g., a set defined by the merchant, a set based on location-specific inventory, only those products that have corresponding 3D representations, etc.). Further, each product item from the inventory database may be augmented by the immersive environment rendering engine 324 to include one or more interactive controls. The interactive controls may allow the user of the customer device 302 to interact with the item in a virtual environment, such as rotate the item, pick up the item, move the item, browse further item description information, browse projected delivery timing information, browse available similar products, place the item in a shopping cart, etc.

In some embodiments, the immersive environment rendering engine 324 is structured to update the 3D model periodically (e.g., when new captured images are received) or on demand (e.g., by receiving an electronic command from the merchant device 352). The immersive environment rendering engine 324 may periodically receive additional captured images from the merchant device 352 and/or the image capture device 368. According to various embodiments, the captured images may include a single image file (e.g., .jpeg, etc.), multiple images in the same or in separate files (e.g., .gif), a 3D image file (e.g., .stl, .obj, .fbx, .dae, 0.3ds, .iges, .step, .vrml, .x3d), a single video file, and/or multiple video files. The images may be captured by a fixed-location camera disposed within the store (e.g., where the image capture device 368 is a closed-circuit television (CCTV) camera, another type of low-resolution security camera, etc.) or by a mobile camera (e.g., a camera built into the merchant device 352). The pictorial content in the captured images may be coarse (e.g., may only need to meet a predetermined resolution threshold) and may represent only a subset of inventory within the physical store, which may allow for preservation of bandwidth when sourcing content for updating the 3D model.

Further, in some embodiments, the pictorial content may be received and/or analyzed by the immersive environment rendering engine 324 only at predetermined time intervals or only when the pictorial content substantially differs from previously received content from a camera at the same location. For example, the additional content may be captured by having a computing device with a camera travel throughout the physical space periodically (e.g., once a day, throughout the day). In another example, fixed cameras (e.g., CCTV cameras) can continuously monitor the products and provide the additional content on a real-time or periodic basis. When receiving a new pictorial content submission from a particular fixed-location camera, the immersive environment rendering engine 324 may perform pre-processing by determining whether the image has substantially changed (based, for example, on determining and comparing content color characteristics, shape characteristics, contrast characteristics, etc.). If an image has not substantively changed from a previously received image, the immersive environment rendering engine 324 may not proceed to the subsequent inventory and item positioning update operations for the 3D model.

Further with respect to the inventory and item positioning update operations, the immersive environment rendering engine 324 may determine inventory level, product positioning, and other information for the corresponding inventory items based on the pictorial content. As an example of determining an inventory level, the immersive environment rendering engine 324 may extract from the pictorial content a subset of a digital image that may correspond to a particular quantity of product (e.g., a stack of folded pairs of jeans). The immersive environment rendering engine 324 may determine, based on characteristics of the extracted subset, that the number of product items in the stack has changed, and may update the 3D model accordingly. As an example of item positioning operations, the immersive environment rendering engine 324 may determine that a particular product has been moved within the physical store, and may generate a new anchoring point within the 3D environment, where the anchoring point includes a new set of coordinates that correspond to the new virtual location. Further, the immersive environment rendering engine 324 may update the product index with this information, associate the product index with a new anchoring point, etc. As another example of item positioning operations, the immersive environment rendering engine 324 may determine that a spotlight surface (e.g., a mannequin) in the physical store now features a different, new product, and may update the 3D virtual environment accordingly by, for example, determining or generating a product index for the different, new product and programmatically binding the product index to an anchoring point on the mannequin.

In an embodiment, the immersive environment rendering engine 324 is structured to customize the user experience within a virtual store defined by one or more 3D models. As described further herein, the customization may include generating and applying a visual modifier to a particular 3D model. As used herein, a visual modifier is a set of computer-executable instructions structured to render an altered version of a virtual store or products therein for a customer associated with a particular customer device 302. Generating an altered version of a virtual store can include embedding in the visual modifier computer-executable instructions to obscure and/or replace individual products or product sets within a rendered 3D model, reposition products, obscure and/or replace various surfaces or surface sets (e.g., aisles that contain products not of interest to the customer), reposition various surfaces or surface sets, populate advertising hotspots (e.g., anchoring points associated with merchant or third-party advertisements) with particular products or third-party content, enhance an object with additional graphical elements (e.g., star, glowing edge, arrow), etc.

In operation according to an example embodiment, after a 3D model for a virtual store is generated, the immersive environment rendering engine 324 may determine that a customer is in close proximity to (e.g., in a larger virtual environment where the virtual store is part of a virtual mall or is integrated into another immersive environment) or has entered a particular virtual store. For example, the customer may navigate an immersive reality environment using the application 334 executing on the customer device 302. In this scenario, the customer device 302 can include immersive reality support functionality. The immersive environment rendering engine 324 may determine that the field of view on the presented to the customer via the user interface 338 of the customer device 302 includes, at least in part, a particular virtual store represented by a particular 3D model. In another example, the immersive environment rendering engine 324 may determine that the customer is within a predetermined radius from a virtual store in a virtual mall, where the radius is determined relative to the coordinates associated with the 3D model that defines the virtual store.

As (before, substantially contemporaneously, or after) the customer enters the virtual store defined by the 3D model, the immersive environment rendering engine 324 may populate the virtual store with one or more products targeted to the customer. The immersive environment rendering engine 324 may render the populated virtual store to the customer via the customer device 302. To render the populated virtual store, the immersive environment rendering engine 324 may generate a visual modifier and apply the visual modifier to computer-executable instructions for rendering or refreshing a previously rendered 3D model.

The visual modifier can be structured to present particular targeted products and blur or hide from view other products. The targeted products can be selected from an inventory store in the platform database 308 that may include the entire inventory of retrievably stored products available for sale in a particular virtual store. The targeted products may be determined by the immersive environment rendering engine 324 based on information received from the customer device 302 or platform database 308, such as a customer profile (e.g., including gender, preferences, size) or an input of an option (e.g., size, color, product type, genre, brand) from the customer on an interface of the user computing device. The information may aid the immersive environment rendering engine 324 in passively or actively (relative to the customer) customizing the 3D model via the visual modifier.

In one example relating to passive customer experience customization, a customer is not required to take any actions to access a customized product set in the virtual store. For instance, the customer device 302 may have a unique device identifier associated therewith, such as a MAC address, IP address, or similar, and/or the customer may be authenticated to the virtual environment (e.g., by the authentication engine 322) by logging in using a specific customer identifier, such as a social networking handle. The immersive environment rendering engine 324 may receive the unique device identifier and/or customer identifier and determine the identity of the customer based on the identifier(s) by using the identifier to query the platform database for information stored in a customer profile.

Accordingly, in some embodiments, the customer may have a customer profile stored on a data storage media accessible to the immersive environment rendering engine 324 (e.g., the platform database 308). The immersive environment rendering engine 324 may query the customer profile to determine the customer's product preferences. For example, in some embodiments, the immersive environment rendering engine 324 may determine that the customer previously visited the same virtual store or another virtual store. The immersive environment rendering engine 324 may access retrievably stored product information regarding the products previously browsed and/or purchased by the customer. For example, the immersive environment rendering engine 324 may identify products where a customer had previously spent at least a predetermined amount of time with a product being in the field of view, interacted with a product, placed the product in a shopping cart, or completed a check-out operation. In an example use case, the immersive environment rendering engine 324 may determine that the user previously viewed camping tents. Accordingly, the immersive environment rendering engine 324 may cause the visual modifier to populate a virtual aisle currently in the customer's field of view with outdoor gear, such as camping tents and related products (hiking boots, etc.) and to obscure other products and/or display surfaces that remain in the field of view but do not relate co camping gear.

In some embodiments, the immersive environment rendering engine 324 may generate a combination virtual store that includes complementary products and/or services from different vendors. For example, the customer may be presented with outdoor gear from a first vendor and with vacation packages (e.g., guided hiking tours) from a second vendor.

In another example relating to customer-assisted (active) user experience customization, the customer may utilize the customer device 302 or another computing device communicatively coupled to the customer device 302 (e.g., a virtual assistant device) to submit a product query before or after entering the virtual store or a particular location within the virtual store. For example, the customer may visit a virtual clothing retailer. The customer may issue a query, such as a natural-language query, for "blue shirts." In response, the immersive environment rendering engine 324 may generate and apply (execute) a visual modifier structured to reduce the product set available in the virtual store only to variants of "blue shirts," such as long-sleeved shirts, short-sleeved shirts, etc. The immersive environment rendering engine 324 may cause the visual modifier to hide inapplicable products from view completely (e.g., remove them from a particular virtual shelf) or make the inapplicable products partially available (e.g., by bringing them out of focus). The 3D model may present the set of products (blue shirts) in a location identical to a corresponding location in the physical store (e.g., on separate shelves or racks) or may consolidate the products into a new location (e.g., all on a single shelf or rack) in the virtual store. The other products that do not satisfy the customer's query can be shown distinctly from the queried products, such as by using a varied opacity, transparency, or blurring.

In some embodiments, the featured products and/or advertisements may be customized to maximize their relevance to the particular customer. Continuing the "blue shirt" example, the customer in a retail clothing store may be presented with virtual mannequins showcasing various blue shirt variants. In another example, a customer entering a virtual book store may be presented with a targeted "book of the month" recommendation generated based on the customer's purchase history, browsing history, and/or customer characteristics stored in the customer profile (occupation, interests, languages, age group, geographical location, etc.). In yet another example, an end cap in a grocery store may present a promoted beverage that is of particular interest to the customer as determined, for example, based on a customer characteristic, browsing history, and/or purchase history.

In operation according to various use cases, a customer may wish to learn more about a particular product presented to the customer using the visual modifier and see the product perform in its intended environment. Accordingly, after detecting a customer interaction (e.g., click, touch, select, hover) with a product, the immersive environment rendering engine 324 may generate a virtual environment that showcases the product's performance. In some configurations, the virtual environment may include customer-interactive features. For example, the customer may be provided with a user interface that allows the customer to specify various parameters associated with the intended environment. For instance, continuing the camping tent example, the user may be presented with different types of terrain (sand, grass, dirt, pavement, etc.) and/or weather conditions (sun, rain, snow, etc.).

According to various embodiments, the product may have one or more built-in hot spots that allow for further customer interaction. Continuing the tent example, upon detecting, based on positioning information from the customer device 302, that a customer is at the entrance to the tent, the immersive environment rendering engine 324 may present a view from inside the tent to enable a realistic product testing experience. In another example, a customer may be provided with a more complex testing experience, such as a virtual test drive of a vehicle, where at least some of the physical automotive controls have user-interactive virtual counterparts.

Figure 4A:
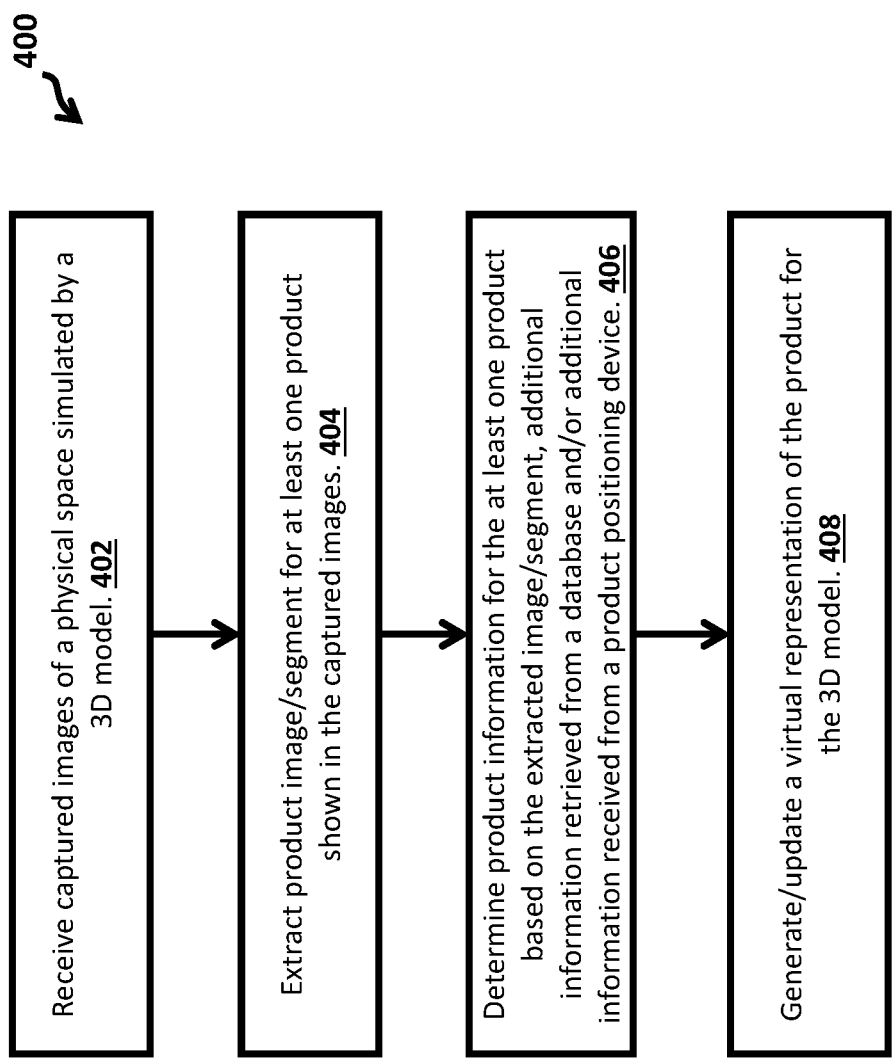
FIG. 4A shows execution steps for building a virtual store based on a physical store, according to an embodiment.

IV. Example Methods and User Interfaces for Generating a Virtual Store Based on a Physical Store FIG. 4A shows execution steps of a method 400 for building a virtual store based on a physical store, according to an embodiment. In operation, various steps of the method 400 can be performed by the e-commerce platform 306, customer device 302, merchant device 352, merchant server 350, or any combination thereof. For instance, in some embodiments, the merchant uses and manages a virtual store via the e-commerce platform 306 where the merchant may share computing resources (e.g., storage space, memory, processor(s)) with other customers of the operator of the e-commerce platform 306. In some embodiments, at least some components of the e-commerce platform 306 can be replicated on the merchant server 350 hosted and/or managed by the merchant.

As shown, at 402, the analytics server 318 of FIG. 3 can receive captured images of a physical space simulated by a particular 3D model. According to various embodiments, the captured images may include a video, one or more two-dimensional images, one or more 3D images, and the like. In some embodiments, a merchant user may capture the images using the image capture device 368 of FIG. 3. In some embodiments, a merchant user may use application 362 on the merchant device 352 to transmit or upload the captured images to the analytics server 318. In some embodiments, the images are electronically transmitted to the analytics server 318 from the merchant server 350 or from another computer system. For example, the merchant may have previously engaged a third-party service provider to generate a video or a 3D tour of the physical store. When onboarding the merchant, the operator of the e-commerce platform 306 may use this information to generate an initial 3D model of the physical store.

As shown, at 404 and 406, the analytics server 318 can detect, based on the received captured images, products available in the physical store. At 404, the analytics server 318 can extract a particular image or a segment of an image from the captured images. The image or segment of an image may show, at least in part, a particular product. Based on the extracted image or segment, at 406, the analytics server 318 can determine (e.g., using photogrammetry, optical character recognition, and the like) a particular product depicted in the image. For example, in some embodiments, more than one captured image may be received. In combination, the captured images may be sufficient to determine the product depicted in the image. In some instances, the images may include a pictorial representation of the product at different angles and/or under different lighting conditions. The analytics server 318 may determine if a first captured image contains a sufficient amount of information to identify the product. If the amount of information is not sufficient (e.g., if the first image contains only a partial representation of the product), the first captured image may be used in combination with at least one captured image to identify the product. In some embodiments, the analytics server 318 generates and assigns a degree of confidence to the determination. If a degree of confidence is below a predetermined threshold, the analytics server 318 may generate and transmit to the merchant device 352 a notification prompting the merchant user to map or tag an image to a particular product from the inventory store in the platform database 308.

In some embodiments, the extracted image or segment includes a computer-readable product identifier (e.g., a color-coded label, QR code, bar code, or another pictorial identifier). The analytics server 318 can query the inventory store in the platform database 308 based on the identifier to retrieve more detailed product information (e.g., a high-resolution 3D representation of a particular product, a 360-degree view rendering of the product, product specifications, product quantity information, etc.). In some embodiments, the analytics server 318 uses supplemental information from the product positioning capture device 370 to determine the product identifier and/or product positioning within the physical store. Accordingly, according to various embodiments, a product identifier can be an alphanumeric identifier or another non-pictorial code readable by a particular product positioning capture device 370. In some embodiments, the e-commerce platform 306 can maintain a cross-reference table that associates pictorial product identifiers with non-pictorial identifiers such that information from the captured images can be linked to, via the cross-referenced identifiers, and supplemented by information received from product positioning capture devices 370.

As shown, at 408, the analytics server 318 can generate and/or update a virtual representation of the identified product in a 3D model. In some embodiments, generating the virtual representation includes identifying the product and retrieving further product information from an inventory store. In some embodiments, generating the virtual representation includes determining product positioning information. In some embodiments, generating the virtual representation includes determining a particular surface on which the physical product is displayed, generating or retrieving a 3D model for a corresponding virtual surface, and programmatically binding a copy or a reference to the high-resolution 3D representation of the product from the inventory database to an anchoring point on the corresponding virtual surface.

Figure 4B:
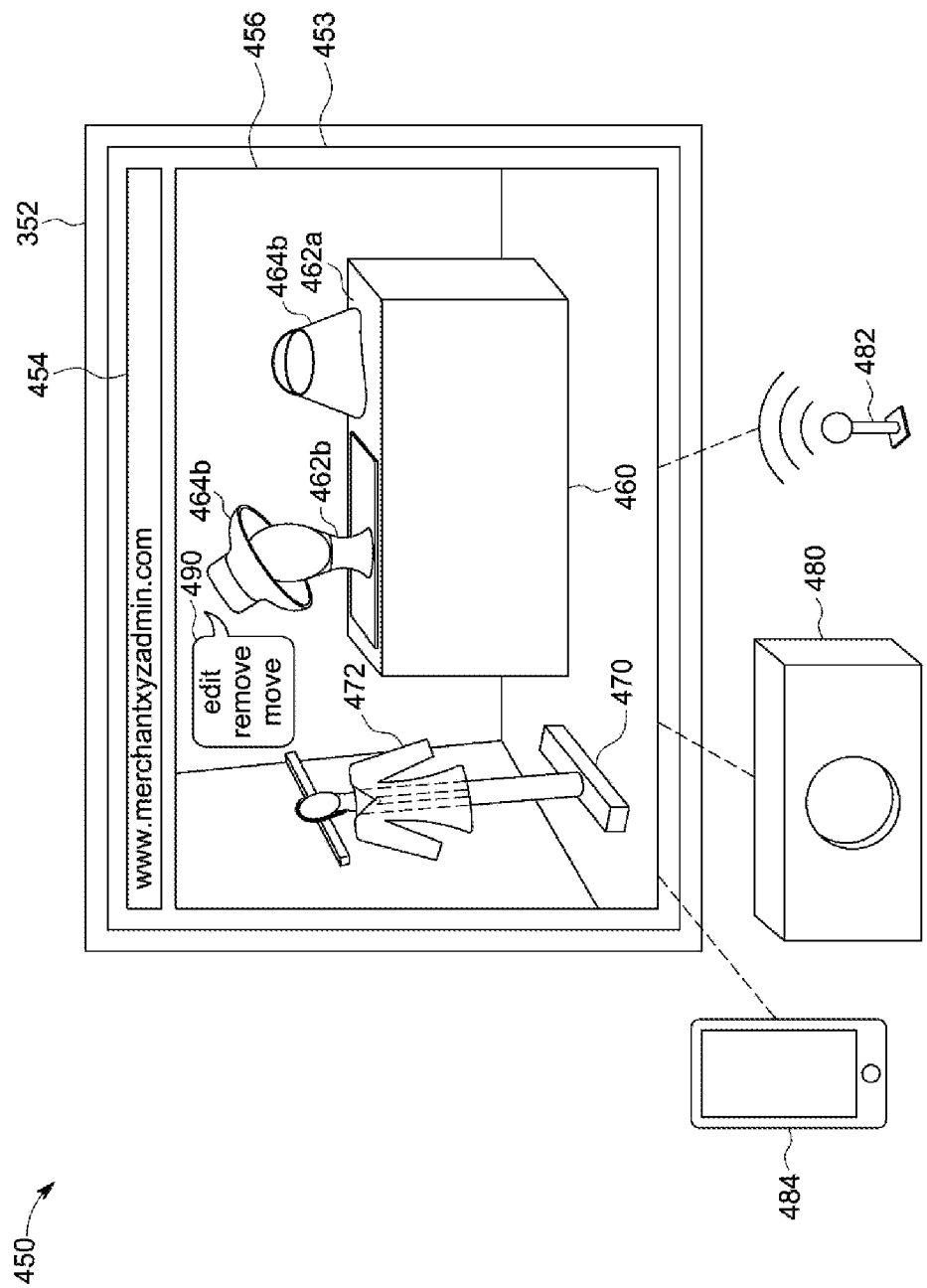
FIG. 4B shows an electronic user interface structured to allow a merchant user to initiate a build of a virtual store based on a physical store, according to an embodiment.

FIG. 4B shows an electronic user interface 453 structured to allow a merchant user to initiate a build of a virtual store based on a physical store using the merchant device of FIG. 3, according to an embodiment. The merchant user can also use the user interface 453 to change various aspects of the virtual store or its products, according to some embodiments. In some embodiments, the user interface 453 includes a browser provided to the merchant device 352. In some embodiments, the user interface 453 is included in an application provided to the merchant device 352, such as the application 362. The user interface 453 is structured to allow a user to navigate to a network address 454, which may be associated with a virtual store administrator application or website. According to various use cases, the application 362 may execute, at least in part, on the e-commerce platform 306 and may be accessible to the operator of the e-commerce platform 306 in addition or instead of being accessible to the merchant user.

A 3D model of a virtual store can be relationally linked to and populated with other 3D models, such that each of a virtual store, a merchandise display object, a surface, a check-out counter, etc., is represented by a 3D model. 3D models can be movably positioned within the 3D model of a virtual store by using coordinate-based anchoring. In some embodiments, the size of each particular 3D model is scaled such that the individual dimensions of each 3D model do not exceed or are in a predetermined ratio to the host 3D model (e.g., the 3D model of the virtual store).

For example, as shown, the 3D model of a virtual store can include one or more virtual merchandise display objects, such as a first merchandise display object 460 (e.g., a display cube, a table, a shelving unit and the like), a second merchandise display object 470 (e.g., a mannequin). A virtual merchandise display object can have one or more display points, such as, for example, the first display point 462a and the second display point 462b. The products 464a, 464b, and 472 can be anchored to their respective display points.

In some embodiments, the merchant user can use the user interface 453 to edit a 3D model generated by the analytics server 318 of FIG. 3. For example, the merchant user can interact with the corresponding virtual objects via the user interface 453 (e.g., copy/paste, drag/drop, create new, etc.) to add, remove, scale, delete the virtual objects and so forth. Accordingly, the merchant user can rearrange the positioning of 3D models for virtual merchandise display objects, display points, and so forth in the virtual store. In some embodiments, the merchant user can edit other aspects of the virtual store, such as add, remove, or move a check-out counter, change the background color, etc.

In some embodiments, the merchant user can use the user interface 453 to identify or edit products with which the analytics server 318 populated the 3D model. For example, in some embodiments, the merchant user can use the pop-up control 490, which can be bound to an example product 464b to edit the product, move the product, remove the product, etc. Editing the product can include tagging the product to a particular merchant user-selected item from an inventory store of the platform database 308 of FIG. 3. Accordingly, the product 464b can be generated based on an inventory item retrieved by the analytics server 318 from the inventory store. As described above, the inventory item can be a high-fidelity representation of a product identified by the analytics server 318 from the captured images and/or inputs from example computing devices 480-484.

Figure 5A:
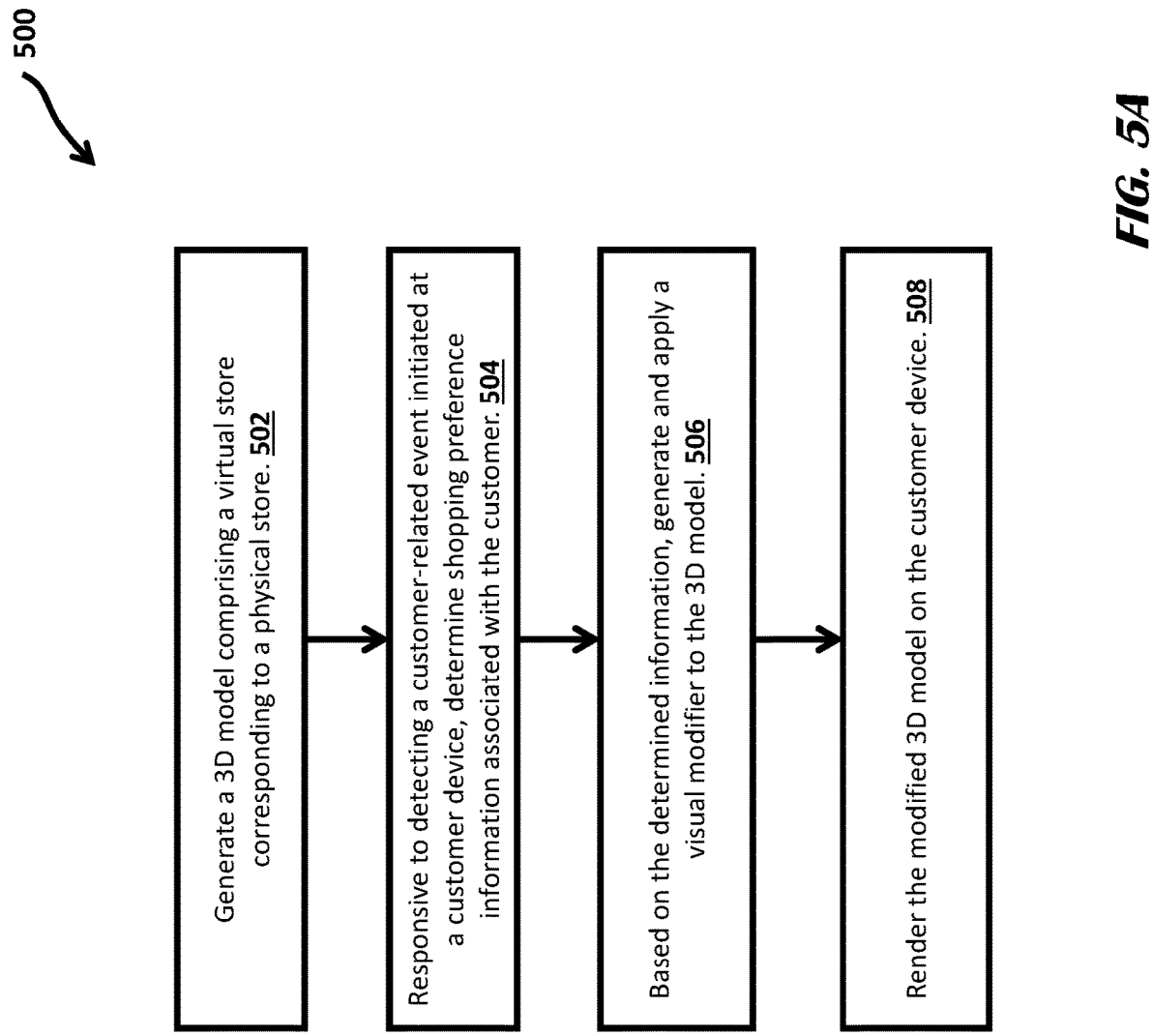
FIG. 5A shows execution steps for customizing a user experience in a virtual store, according to an embodiment.

V. Example Methods and User Interfaces for Customizing User Experience in a Virtual Store FIG. 5A shows execution steps of a method 500 for customizing a user experience in a virtual store, according to an embodiment, and FIG. 5B shows an electronic user interface 556 structured to allow a customer-user to interact with products in a customized virtual store, according to an embodiment.

In operation, various steps of the method 500 can be performed by the e-commerce platform 306, customer device 302, merchant device 352, merchant server 350, or any combination thereof. When executed, the operations of method 500 render to the customer 552, via the customer device 302 of FIG. 3, the user interface 556. The user interface 556 FIG. 5 can be an immersive reality interface provided to the customer by the immersive environment rendering engine 324 of FIG. 3. Accordingly, in various embodiments, the user interface 556 can include a display, a projected environment, a hologram, a tactile input/output circuit, an olfactory input/output circuit, etc. the user interface 556 can be accessible to the customer via a customer device 302 described in reference to FIG. 3. More generally, the customer device 302 may include a desktop, laptop, tablet, headset, and/or another computing device structured to generate and provide the immersive reality user interface 556 to the customer 552. The customer device 302 may further include user-interactive controls (e.g., an eye movement recognition circuit, a gesture recognition circuit, a joystick, a mouse, and/or another device structured to detect and accept user input). The customer device 302 is structured to perform operations sufficient to render to the customer 552, via the immersive environment rendering engine 324 of FIG. 3, information regarding one or more purchasable items and enable the customer 552 to select one or more items for purchase. To that end, in some embodiments, the immersive reality device 502 may be structured to render to the customer a 3D model for a virtual store.

As shown, at 502, the immersive environment rendering engine 324 generates a 3D model for a virtual store, which corresponds to a physical store. The 3D model can include various virtual objects, such as such as a third merchandise display object 560 (e.g., a display cube, a table, a shelving unit and the like), a fourth merchandise display object 570 (e.g., a mannequin), etc. A virtual merchandise display object can have one or more display points, such as, for example, the display point 562a and 562b. The products 564a, 564b, and 572 can be anchored to their respective display points.

As shown, at 504, the immersive environment rendering engine 324 of FIG. 3 can determine shopping preference information associated with the customer 552. Customer 552 operates the customer device 302. In some embodiments, the immersive environment rendering engine 324 can receive a device identifier of the customer device 302. In some embodiments, the immersive environment rendering engine 324 can receive customer login information for the customer 552. Based on the device identifier and/or the customer login information, the immersive environment rendering engine can access a retrievably stored customer profile for a customer 552 and generate a visual modifier 580 to display the relevant products based on information from the customer profile. In some embodiments, instead or in addition to using information from a customer profile, the immersive environment rendering engine 324 can receive a customer 552 query. For example, as shown, the customer 552 may issue the following natural language query via the customer device 302 or a virtual assistant device electronically coupled thereto: "I'd like to buy accessories for my outfit for next week's party." The device can transmit the query of the customer 552 to the analytics server 318, which may extract from the query at least one keyword indicative of a product or a set of products that should be provided to the customer 552 via the user interface 556 in response to the query.

As shown, at 506, the immersive environment rendering engine 324 can generate a visual modifier 580 and, at 508, apply the visual modifier to modify the items presented to the customer 552 via the user interface 556. According to various embodiments, the visual modifier 580 can obscure and/or replace individual products or product sets within a rendered 3D model, reposition products, obscure and/or replace various surfaces or surface sets (e.g., aisles that contain products not of interest to the customer), reposition various surfaces or surface sets, populate advertising hotspots (e.g., anchoring points associated with merchant or third-party advertisements) with particular products or third-party content, etc.

In a non-limiting example, the immersive environment rendering engine 324 can determine, based on a keyword extracted from the customer's query (e.g., "accessories") that the customer is interested only in accessories. Accordingly, the immersive environment rendering engine 324 may cause the visual modifier 580 to blur or hide from view the products that are not responsive to the query and/or their associated display points. As shown, the visual modifier 580 causes the user interface 556 to render a modified 3D model of the virtual store where the items 572 (shown as being an article of clothing) and 570 (shown as being a display point for the item 572), which are not responsive to the query for "accessories," are hidden from view.

In some embodiments, the immersive environment rendering engine 324 can generate an indicator 582 and render the indicator 582 to the customer 552 via the user interface 556 modified using the visual modifier 580. As shown, the indicator 582 can provide a visual or auditory indication of the selected products 564a and 546b (a handbag and a hat, respectively), which are responsive to the customer's request for "accessories."

In some embodiments, immersive environment rendering engine 324 can cause the visual modifier 580 to provide to the customer 552 an aisle, display point(s) or set of products that is responsive to the customer's coordinate-based location within the 3D model for a virtual store. For example, the immersive environment rendering engine 324 can receive from the customer device 302 information regarding items displayed in the field of view. The immersive environment rendering engine 324 can determine the relative location of the customer based at least on this information. The immersive environment rendering engine 324 can subsequently receive from the customer device 302 updated information, which may include an updated coordinate set and/or rotational information. For example, the customer may have remained in the same location turned 90 degrees to the right. Accordingly, the immersive environment rendering engine 324 can analyze the 3D model to determine which items and products are positioned in the corresponding location in the physical store and may cause the visual modifier 580 to render the corresponding virtual products and their corresponding display objects and display points to the customer 552. In another example, when the virtual store is part of a virtual mall, the immersive environment rendering engine 324 can select from the platform database 308 and render to the customer 552 a storefront for a different virtual store. The different virtual store can be selected based on various informational items associated with the customer 552, such as customer profile, the type of items viewed in the previous virtual store, the price range of items viewed in the previous virtual store, the type of items purchased, etc.

Referring again to the user interface 556 of FIG. 5B, the customer 552 may interact with various items in the field of view, such as the selected products 564a and 546b, to further examine the products, place the selected products 564a and 546b in a shopping cart, and perform various other shopping-related operations in the virtual store. In some embodiments, the customer 552 may initiate payment for the selected products using payment credentials accessible via the digital wallet 340 of the customer device 302. In some embodiments, the customer device 302 can be implemented as multiple customer devices, such as an immersive reality device for accessing the virtual store and initiating check-out operations and a productivity device for securely performing check-out operations. In such embodiments, the analytics server 318 may generate and transmit to the productivity device an electronic instruction to retrieve payment credentials and initiate a payment transaction in response to determining that the customer 552 initiated a check-out operation via the immersive reality device.

In one aspect, a method may comprise receiving, by a computer, captured images of a physical space having a set of products wherein the physical space is simulated by a three-dimensional (3D) model of the physical space and a corresponding representation of the set of products positioned relative to the 3D model; detecting, by the computer based on the captured images, product information for products in the physical space; and generating, by the computer based on the product information, an updated representation of the set of products based on the product information, wherein the updated representation of the set of products corresponds to the products in the physical space as shown in the captured images.

The method may further update the 3D model of the physical space based on the captured images.

The 3D model of the physical space may comprise a surface rendering representative of a surface in the physical space as shown in the captured images.

The product information may comprise a 3D rendering of a product from the set of products.

The method may further anchor, by the computer, the updated representation of the product to the surface, comprising generating a product index comprising a product identifier item and a positioning coordinates item.

The method may further comprise: recognizing, by the computer, the product in the captured images; obtaining, by the computer, a 3D rendering of the product from a database; and generating the product index, comprising populating the product index with the product identifier that corresponds to the 3D rendering of the product from the database, wherein the 3D model of the physical space contains the 3D rendering of the product from the database as the updated representation of the product in a position corresponding to the positioning coordinates item from the product index.

The 3D rendering of the product may have a higher resolution than the captured images.

The method may further comprise determining, by the computer, a location of the product; generating the positioning coordinates item for the product index based on the location; and rendering, by the computer, the product within the 3D model of the physical space to correspond to the location of the product in the physical space.

The method may further comprise receiving, by the computer from a secondary device, positioning data representing the location of the product in the physical space; and determining, by the computer, a physical location of the product based on the positioning data.

In another aspect, a non-transitory machine-readable storage medium having computer-executable instructions stored thereon that, when executed by one or more processors, cause the one or more processors to perform operations comprising: receiving, by a computer, captured images of a physical space having a set of products wherein the physical space is simulated by a three-dimensional (3D) model of the physical space and a corresponding representation of the set of products positioned relative to the 3D model; detecting, by the computer based on the captured images, product information for products in the physical space; and generating, by the computer based on the product information, an updated representation of the set of products based on the product information, wherein the updated representation of the set of products corresponds to the products in the physical space as shown in the captured images.

The operations may update the 3D model of the physical space based on the captured images.

The 3D model of the physical space may further comprise a surface rendering representative of a surface in the physical space as shown in the captured images.

The product information may comprise a 3D rendering of a product from the set of products.

The operations may further comprise anchoring, by the computer, the updated representation of the product to the surface, at least by generating a product index comprising a product identifier item and a positioning coordinates item.

The operations further comprise recognizing, by the computer, the product in the captured images; obtaining, by the computer, a 3D rendering of the product from a database; and generating the product index, comprising populating the product index with the product identifier that corresponds to the 3D rendering of the product from the database, wherein the 3D model of the physical space contains the 3D rendering of the product from the database as the updated representation of the product in a position corresponding to the positioning coordinates item from the product index.

The 3D rendering of the product may have a higher resolution than the captured images.

The operations may further comprise determining, by the computer, a location of the product; generating the positioning coordinates item for the product index based on the location; and rendering, by the computer, the product within the 3D model of the physical space to correspond to the location of the product in the physical space.

The operations may further comprise receiving, by the computer from a secondary device, positioning data representing the location of the product in the physical space; and determining, by the computer, a physical location of the product based on the positioning data.

In yet another aspect, a computer system comprising a memory and at least one processor, the memory having computer-executable instructions stored thereon that cause the at least one processor to perform operations comprising receiving, by a computer, captured images of a physical space having a set of products wherein the physical space is simulated by a three-dimensional (3D) model of the physical space and a corresponding representation of the set of products positioned relative to the 3D model; detecting, by the computer based on the captured images, product information for products in the physical space; and generating, by the computer based on the product information, an updated representation of the set of products based on the product information, wherein the updated representation of the set of products corresponds to the products in the physical space as shown in the captured images.

The operations may further comprise updating the 3D model of the physical space based on the captured images.

In one aspect, a method comprises transmitting, by a computing device to a user device, a 3D virtual environment of a virtual store configured for presenting at least one product from a set of products positioned on a virtual structure simulating a corresponding physical store; determining, by the computing device, based on information received from the user device, a subset of the set of products relevant to a virtual user; and transmitting, by the computing device, a visual modifier to the user device, the visual modifier configured to distinguish the subset of the set of products from remaining products in the set of products positioned in the 3D virtual environment.

Determining the subset of the set of products may comprise identifying at least one product from another physical location.

The visual modifier may emphasize the subset of the set of products.

The visual modifier may modify a rendering of the remaining products in the set of products.

The information received from the user device may comprise a search query for an attribute of the subset of the set of products.

The information received from the user device may comprise an identifier for a profile of the virtual user.

Determining the subset of the set of products may be partially based on at least one of a browsing activity history or a purchase history of the virtual user.

At least one product in the set of products may be displayed in a virtual location in the virtual store corresponding to a physical location in the corresponding physical store configured for a promotional product.

In another aspect, a non-transitory machine-readable storage medium having computer-executable instructions stored thereon that, when executed by one or more processors, cause the one or more processors to perform operations comprising: transmitting, by a computing device to a user device, a 3D virtual environment of a virtual store configured for presenting at least one product from a set of products positioned on a virtual structure simulating a corresponding physical store; determining, by the computing device, based on information received from the user device, a subset of the set of products relevant to a virtual user; and transmitting, by the computing device, a visual modifier to the user device, the visual modifier configured to distinguish the subset of the set of products from remaining products in the set of products positioned in the 3D virtual environment.

Determining the subset of the set of products may comprise identifying at least one product from another physical location.

The visual modifier may emphasize the subset of the set of products.

The visual modifier may modify a rendering of the remaining products in the set of products.

The information received from the user device may comprise a search query for an attribute of the subset of the set of products.

The information received from the user device may comprise an identifier for a profile of the virtual user.

Determining the subset of the set of products may be partially based on at least one of a browsing activity history or a purchase history of the virtual user.

At least one product in the set of products may be displayed in a virtual location in the virtual store corresponding to a physical location in the corresponding physical store configured for a promotional product.

In yet another aspect, a computer system comprising a memory and at least one processor, the memory having computer-executable instructions stored thereon that cause the at least one processor to perform operations comprising: transmitting, by a computing device to a user device, a 3D virtual environment of a virtual store configured for presenting at least one product from a set of products positioned on a virtual structure simulating a corresponding physical store; determining, by the computing device, based on information received from the user device, a subset of the set of products relevant to a virtual user; and transmitting, by the computing device, a visual modifier to the user device, the visual modifier configured to distinguish the subset of the set of products from remaining products in the set of products positioned in the 3D virtual environment.

The information that may be received from the user device may comprise a search query for an attribute of the subset of the set of products.

The visual modifier may emphasize the subset of the set of products.

The information received from the user device may comprise an identifier for a profile of the virtual user.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a computer, captured images of a physical space having a set of objects wherein the physical space is simulated by a three-dimensional (3D) model of the physical space and a corresponding representation of the set of objects positioned relative to the 3D model;
   determining, by the computer based on the captured images, information for objects in the physical space, the determining including:
      segmenting, based on at least one visual attribute, the captured images into a plurality of portions,
      extracting at least a portion of the captured images, and
      identifying the objects based on the extracted at least the portion of the captured images,
      wherein when an identity of a first object is not determined using a first captured image, the computer identifies the first object using a second captured image that depicts the first object; and
   generating, by the computer based on the object information, an updated representation of the set of objects in the 3D model based on the object information, wherein the updated representation of the set of objects corresponds to the objects in the physical space as shown in the captured images.

2. The method of claim 1, further comprising updating the 3D model of the physical space based on the captured images.

3. The method of claim 1, wherein the 3D model of the physical space further comprises a surface rendering representative of a surface in the physical space as shown in the captured images.

4. The method of claim 1, wherein the object information comprises a 3D rendering of an object from the set of objects.

5. The method of claim 4, further comprising anchoring, by the computer, the updated representation of the object to the surface, comprising generating an object index comprising an object identifier item and a positioning coordinates item.

6. The method of claim 5, further comprising:
recognizing, by the computer, the object in the captured images;
obtaining, by the computer, a 3D rendering of the object from a database; and
generating the object index, comprising populating the object index with the object identifier that corresponds to the 3D rendering of the object from the database, wherein the 3D model of the physical space contains the 3D rendering of the object from the database as the updated representation of the object in a position corresponding to the positioning coordinates item from the object index.

7. The method of claim 6, wherein the 3D rendering of the object has a higher resolution than the captured images.

8. The method of claim 5, further comprising:
determining, by the computer, a location of the object;
generating the positioning coordinates item for the object index based on the location; and
rendering, by the computer, the object within the 3D model of the physical space to correspond to the location of the object in the physical space.

9. The method of claim 8, further comprising:
receiving, by the computer from a secondary device, positioning data representing the location of the object in the physical space; and
determining, by the computer, a physical location of the object based on the positioning data.

10. A non-transitory machine-readable storage medium having computer-executable instructions stored thereon that, when executed by one or more processors, cause the one or more processors to perform operations comprising:
receiving, by a computer, captured images of a physical space having a set of objects wherein the physical space is simulated by a three-dimensional (3D) model of the physical space and a corresponding representation of the set of objects positioned relative to the 3D model;
determining, by the computer based on the captured images, object information for objects in the physical space, the determining including:
segmenting, based on at least one visual attribute, the captured images into a plurality of portions,
extracting at least a portion of the captured images, and
identifying the objects based on the extracted at least the portion of the captured images,
wherein when an identity of a first object is not determined using a first captured image, the computer identifies the first object using a second captured image that depicts the first object; and
generating, by the computer based on the object information, an updated representation of the set of objects based on the object information,
wherein the updated representation of the set of objects corresponds to the objects in the physical space as shown in the captured images.

11. The medium of claim 10, the operations further comprising updating the 3D model of the physical space based on the captured images.

12. The medium of claim 10, wherein the 3D model of the physical space further comprises a surface rendering representative of a surface in the physical space as shown in the captured images.

13. The medium of claim 10, wherein the object information comprises a 3D rendering of an object from the set of objects.

14. The medium of claim 13, the operations further comprising anchoring, by the computer, the updated representation of the object to the surface at least by generating an object index comprising an object identifier item and a positioning coordinates item.

15. The medium of claim 14, the operations further comprising:
recognizing, by the computer, the object in the captured images;
obtaining, by the computer, a 3D rendering of the object from a database; and
generating the object index, comprising populating the object index with the object identifier that corresponds to the 3D rendering of the object from the database, wherein the 3D model of the physical space contains the 3D rendering of the object from the database as the updated representation of the object in a position corresponding to the positioning coordinates item from the object index.

16. The medium of claim 15, wherein the 3D rendering of the object has a higher resolution than the captured images.

17. The medium of claim 16, the operations further comprising:
determining, by the computer, a location of the object;
generating the positioning coordinates item for the object index based on the location; and
rendering, by the computer, the object within the 3D model of the physical space to correspond to the location of the object in the physical space.

18. The medium of claim 17, the operations further comprising:
receiving, by the computer from a secondary device, positioning data representing the location of the object in the physical space; and
determining, by the computer, a physical location of the object based on the positioning data.

19. A computer system comprising a memory and at least one processor, the memory having computer-executable instructions stored thereon that cause the at least one processor to perform operations comprising:
receiving, by a computer, captured images of a physical space having a set of objects wherein the physical space is simulated by a three-dimensional (3D) model of the physical space and a corresponding representation of the set of objects positioned relative to the 3D model;
determining, by the computer based on the captured images, object information for objects in the physical space, the determining including:

segmenting, based on at least one visual attribute, the captured images into a plurality of portions,
extracting at least a portion of the captured images, and
identifying the objects based on the extracted at least the portion of the captured images,
wherein when an identity of a first object is not determined using a first captured image, the computer identifies the first object using a second captured image that depicts the first object; and
generating, by the computer based on the object information, an updated representation of the set of objects in the 3D model based on the object information,
wherein the updated representation of the set of objects corresponds to the objects in the physical space as shown in the captured images.

20. The system of claim 19, the operations further comprising updating the 3D model of the physical space based on the captured images.

* * * * *